(12) United States Patent
Hatano (10) Patent No.: US 8,182,932 B2
(45) Date of Patent: May 22, 2012

(54) SN-PLATED COPPER ALLOY STRIP HAVING IMPROVED FATIGUE CHARACTERISTICS

(75) Inventor: Takaaki Hatano, Koza-gun (JP)

(73) Assignee: JP Nippon Mining & Metals Corporation (JP)

( * ) Notice: Subject to any disclaimer, the term of this patent is extended or adjusted under 35 U.S.C. 154(b) by 717 days.

(21) Appl. No.: 11/988,116

(22) PCT Filed: Jun. 30, 2006

(86) PCT No.: PCT/JP2006/313134
§ 371 (c)(1),
(2), (4) Date: Dec. 31, 2007

(87) PCT Pub. No.: WO2007/004581
PCT Pub. Date: Jan. 11, 2007

(65) Prior Publication Data
US 2009/0130480 A1    May 21, 2009

(30) Foreign Application Priority Data

Jun. 30, 2005 (JP) ................................. 2005-192939

(51) Int. Cl.
*B32B 15/00* (2006.01)
*B32B 15/20* (2006.01)
(52) U.S. Cl. ........................................ 428/647; 428/929
(58) Field of Classification Search .................. None
See application file for complete search history.

(56) References Cited

U.S. PATENT DOCUMENTS

| 4,441,118 A * | 4/1984 | Fister et al. ................... 257/677 |
| 2003/0211357 A1 | 11/2003 | Harada et al. ................. 428/687 |
| 2004/0007294 A1 | 1/2004 | Fukamachi et al. .......... 148/433 |

FOREIGN PATENT DOCUMENTS

| JP | 52102841 A | 8/1977 |
| JP | 52114537 A | 9/1977 |
| JP | 64-030124 | 2/1989 |
| JP | 07-166390 | 6/1995 |
| JP | 10-270836 | 10/1998 |
| JP | 11-124683 | 5/1999 |
| JP | 11-140569 | 5/1999 |
| JP | 2003-293187 | 10/2003 |
| JP | 2003-321720 | 11/2003 |

(Continued)

OTHER PUBLICATIONS

Historical Standards for Specifications for Copper Alloy Strip for Use in Manufacture of Electrical Connectors and Spring Contacts, 2004.*

(Continued)

*Primary Examiner* — Jennifer McNeil
*Assistant Examiner* — Adam Krupicka
(74) *Attorney, Agent, or Firm* — Drinker Biddle & Reath LLP (57) ABSTRACT

The object of the invention is to provide a reflow Sn-plated copper alloy strip having improved fatigue characteristics by preventing the degradation of fatigue characteristics caused by reflow Sn plating. The invention provides a copper alloy strip having an Sn or Sn alloy plating film formed thereon by electroplating and reflowing treatment, wherein average hydrogen concentration in the strip being about 2 mass ppm or less.

8 Claims, 1 Drawing Sheet

FOREIGN PATENT DOCUMENTS

| | | |
|---|---|---|
| JP | 2004-002988 | 1/2004 |
| JP | 2004-002989 | 1/2004 |
| JP | 2004-156147 | 6/2004 |
| JP | 2004-176163 | 6/2004 |
| JP | 2004-218084 | 8/2004 |
| JP | 2005-048262 | 2/2005 |

OTHER PUBLICATIONS

Machine Translation of JP 10-270836 (Sep. 10, 1998)—Printed Sep. 2, 2010.*

Kinzoku Zairyo no Jiten, "Hydrogen Fragility", Kabushiki Kaisha Asakura Shoten 1: 193-194 (Jan. 25, 1990).

* cited by examiner

SN-PLATED COPPER ALLOY STRIP HAVING IMPROVED FATIGUE CHARACTERISTICS

FIELD OF THE INVENTION

The present invention relates to an Sn-plated copper alloy strip having improved fatigue characteristics, suitable as electrically conductive material for a connector, terminal, relay, switch and the like.

BACKGROUND OF THE INVENTION

Sn-plated copper alloy strips have been used as electrically conductive material for a terminal, connector, relay, switch, and the like. After Sn-plated copper alloy strips are molded into electronic components, they will be repeatedly subjected to stress equal to or less than their elastic limit caused by, for example, insertion and pullout of the connecter, on-off action of the switch or relay, and vibration. Therefore, an Sn-plated copper strip, which is used in a connector, terminal, relay, switch and the like, is required to have good fatigue characteristics. In recent years, as electronic components have become thinner and smaller, the stress repeatedly imposed on metallic elements is likely to increase. In addition, the requirement for the reliability and durability of electronic components has also become severer. Therefore, the need for improved fatigue characteristics is growing.

In response, various technologies for improving the fatigue characteristics of copper alloy have been disclosed in the past (e.g., Japanese unexamined patent publication No. 2004-218084).

Problems to be Solved by the Invention

The inventors have found out a phenomenon that the fatigue limit of a reflow Sn-plated copper alloy strip becomes smaller than the copper alloy strip by 20%. This means that improvement in the fatigue characteristics of a reflow Sn-plated copper alloy strip requires not only to improve the fatigue characteristics of copper alloy, but also to prevent the degradation of the fatigue characteristics caused by the reflow Sn plating. However, there have been no technologies reported which enable to prevent the degradation of the fatigue characteristics caused by reflow Sn plating. Accordingly, the object of the invention is to provide a reflow Sn-plated copper alloy strip having improved fatigue characteristics by preventing the degradation of the fatigue characteristics caused by reflow Sn plating.

Means for Solving the Problem

The inventors have focused attention on average hydrogen concentration in a reflow Sn-plated copper alloy strip, and studied the relation between the average hydrogen concentration and fatigue characteristics of a reflow Sn-plated copper alloy strip. As a result, the inventors have found out that the material having higher average hydrogen concentration has inferior fatigue characteristics.

The invention has been made based on this finding, and provides:

(1) an Sn-plated copper alloy strip comprising an Sn or Sn alloy plating film formed on the surface of a copper alloy strip by electroplating and reflowing treatment, average hydrogen concentration in the copper alloy strip being about 2 mass ppm or less;

(2) the Sn-plated copper alloy strip of the item (1), wherein the plating film comprises an Sn phase and an Sn—Cu alloy phase in this order from the plating film surface toward inside, the thickness of the Sn phase being about 0.02 to about 2.0 μm, and the thickness of the Sn—Cu alloy phase being about 0.1 to about 2.0 μm;

(3) the Sn-plated copper alloy strip of the item (1), wherein the plating film comprises an Sn phase, an Sn—Cu alloy phase and a Cu phase in this order from the plating film surface toward inside, the thickness of the Sn phase being about 0.02 to about 2.0 μm, the thickness of the Sn—Cu alloy phase being about 0.1 to about 2.0 μm, and the thickness of the Cu alloy phase being about 0 to about 2.0 μm;

(4) the Sn-plated copper alloy strip of the item (1), wherein the plating film comprises an Sn phase, an Sn—Ni alloy phase, and a Ni phase in this order from the plating film surface toward inside, the thickness of the Sn phase being about 0.02 to about 2.0 μm, the thickness of the Sn—Ni alloy phase being about 0.1 to about 2.0 μm, and the thickness of the Ni alloy phase being about 0 to about 2.0 μm;

(5) the Sn-plated copper alloy strip of the item (1), wherein the plating film comprises an Sn phase, a Cu—Sn alloy phase, and a Ni phase in this order from the plating film surface toward inside, the thickness of the Sn phase being about 0.02 to about 2.0 μm, the thickness of the Cu—Sn alloy phase being about 0.1 to about 2.0 μm, and the thickness of the Ni alloy phase being about 0.1 to about 2.0 μm;

(6) the Sn-plated copper alloy strip of any one of the items (1)-(5), wherein the copper alloy strip comprises about 1.0 to about 4.5 mass % of Ni, about 0.2 to about 1.2 mass % of Si, optionally one or more elements selected from the group consisting of Sn, P, Zn, Ti, Mg, Al, Zr, Cr, Co, Mo, Fe, Ag and Mn in about 2.0 mass % or less in total, and the balance being copper and unavoidable impurities;

(7) the Sn-plated copper alloy strip of any one of the items (1)-(5), wherein the copper alloy strip comprises about 1 to about 11 mass % of Sn, about 0.01 to about 0.35 mass % of P, optionally one or more elements selected from the group consisting of Ni, Si, Zn, Ti, Mg, Al, Zr, Cr, Co, Mo, Fe, Ag and Mn in about 2.0 mass % or less in total, and the balance being copper and unavoidable impurities;

(8) the Sn-plated copper alloy strip of any one of the items (1)-(5), wherein the copper alloy strip comprises about 22 to about 40 mass % of Zn, optionally one or more elements selected from the group consisting of Ni, Si, Sn, P, Ti, Mg, Al, Zr, Cr, Co, Mo, Fe, Ag and Mn in about 2.0 mass % or less in total, and the balance being copper and unavoidable impurities;

(9) the Sn-plated copper alloy strip of any one of the items (1)-(5), wherein the copper alloy strip comprises about 2 to about 22 mass % of Zn, optionally one or more elements selected from the group consisting of Ni, Si, Sn, P, Ti, Mg, Al, Zr, Cr, Co, Mo, Fe, Ag and Mn in about 2.0 mass % or less in total, and the balance being copper and unavoidable impurities;

(10) the Sn-plated copper alloy strip of any one of the items (1)-(5), wherein the copper alloy strip comprises about 1.0 to about 5.0 mass % of Ti, optionally one or more elements selected from the group consisting of Ni, Si, Sn, P, Zn, Mg, Al, Zr, Cr, Co, Mo, Fe, Ag and Mn in about 2.0 mass % or less in total, and the balance being copper and unavoidable impurities.

Incidentally, Sn plating may be applied on copper alloy strip either before the presswork for producing electronic components such as a terminal and a connector (pre-presswork plating), or after the presswork (post-presswork plating). The advantageous effects according to the present invention can be obtained in both applications.

Advantageous Effect of the Invention

The invention enables to provide a reflow Sn-plated copper alloy strip having good fatigue characteristics.

BEST MODE FOR CARRYING OUT THE INVENTION

The reason why the invention sets the limits is explained hereinafter.
(1) Average Hydrogen Concentration
When average hydrogen concentration exceeds about 2 mass ppm, the deterioration of fatigue characteristics becomes remarkable. Therefore, average hydrogen concentration is restricted to about 2 mass ppm or less, preferably less than about 1.5 mass ppm, more preferably less than about 1.0 mass ppm, and most preferably less than about 0.5 mass ppm. The term "average hydrogen concentration" herein means average hydrogen concentration in an Sn plated strip (including both plating layers and copper alloy), and the average hydrogen concentration has a correlation with fatigue characteristics. Although not wishing to be limited by theory, the fatigue characteristics of an Sn plaited strip may be explained by the following mechanism.
1) Hydrogen gas is generated on the surface of material to be plated during Sn electroplating.
2) The generated hydrogen gas is partially incorporated in the Sn plating film.
3) The hydrogen gas incorporated in the plating is dissociated to atomic hydrogen, and diffused in the plating layer and copper alloy during reflowing treatment.
4) The atomic hydrogen decreases the strength of crystalline grain boundaries in the plating layer and copper alloy, thereby shortening fatigue life.

In this way, reflowing treatment causes the deterioration of fatigue characteristics. That is, if reflowing treatment is omitted, the hydrogen diffusion process in the plating layer and copper alloy does not progress, and therefore relatively good fatigue characteristics will be achieved even if analytical average hydrogen concentration value is relatively high. We have studied the effect of Sn electroplating in the present invention, although there is possibility that hydrogen is mixed in the Sn plated strip also from Ni undercoat, etc., other than Sn plating.

On the contrary, as an example of prior art, Japanese unexamined patent publication No. 2002-88496 looked into hydrogen concentration in Sn-plated copper alloy strip. This disclosure relates to an Sn plated strip having Ni (alloy) undercoat, and the increase in contact resistance caused by exposure to high temperature is prevented by introducing about 0.5 to about 5000 ppm of hydrogen into the Ni (alloy) film.

However, Jpn. pat. pub. No. 2002-88496 does not mention that hydrogen introduced during plating process deteriorates fatigue characteristics. Furthermore, although it examined the inventive effect on an Sn plated strip having Ni undercoat and brass in the example section, no reflowing (heat melting) treatment was conducted on the plating strip after electroplating. Reflowing treatment considerably changes the structure of a plating film. For example, it generates an Sn—Ni alloy phase between Sn layer and Ni layer. In addition, it also changes the existence form of hydrogen. For example, hydrogen gas incorporated in a plating film dissolves in the form of atomic hydrogen in the plating film or copper alloy during reflowing treatment. As a result, various characteristics of plated material as well as the effect of hydrogen on the plated material characteristics will change. As stated above, the degree of effect of hydrogen on fatigue characteristics depends on the presence of reflowing treatment. Jpn. pat. pub. No. 2002-88496 does not mention or suggest the relation between reflowing treatment and the degradation of fatigue characteristics caused by hydrogen. Accordingly, the present invention could not be made by analogy to Jpn. pat. pub. No. 2002-88496. Furthermore, Jpn. pat. pub. No. 2002-88496 does not disclose the structure of the plating strip in accordance with the invention.
(2) Type of Plating and Structure of Plating Layer.
Although there is no particular restriction on the specifications of reflow Sn plating to which the invention is applicable, examples of the reflow Sn plating includes the following plating.
a) Reflow Sn Plating without Undercoat
For reflow Sn plating without undercoat, electroplating is directly applied on the surface of copper alloy, and then reflowing treatment is performed. Since Cu contained in the copper alloy diffuses in the Sn plating layer during the reflowing treatment, the plating film structure comprises an Sn phase and a Cu—Sn phase in this order from the surface toward inside after the reflowing treatment.

The thickness of the Sn phase is preferably about 0.02 to about 2.0 μm after the reflowing treatment. Below about 0.02 μm, solderability deteriorates. Above about 2.0 μm, fatigue characteristics tend to deteriorate.

The thickness of the Sn—Cu alloy phase formed by the reflowing treatment is preferably about 0.1 to about 2.0 μm. As explained in Japanese Patent No. 3,391,427, the Sn—Cu alloy phase is hard. Therefore, it will contribute to reduced insertion force if the thickness is about 0.1 μm or more. On the other hand, when the thickness is more than about 2.0 μm, fatigue characteristics tend to deteriorate.

The aforementioned plating structure can be obtained by adjusting the thickness of Sn plating as appropriate within about 0.4 to about 2.2 μm in electroplating, and conducting reflowing treatment under appropriate condition in temperature range of about 230 to about 600° C. and time range of about 3 to about 30 seconds.
b) Reflow Sn Plating with Cu Undercoat
For reflow Sn plating with Cu undercoat, Cu undercoat and Sn plating are applied in this order on the surface of copper alloy, and then reflowing treatment is performed. Since Cu contained in the Cu undercoat layer diffuses in the Sn plating layer during the reflowing treatment, the plating film structure comprises an Sn phase, a Cu—Sn phase, and a Cu phase in this order from the surface toward inside after the reflowing treatment.

The thickness of the Sn phase is preferably about 0.02 to about 2.0 μm after the reflowing treatment. Below about 0.02 μm, solderability deteriorates. Above about 2.0 μm, fatigue characteristics tend to deteriorate.

The thickness of the Sn—Cu alloy phase is preferably about 0.1 to about 2.0 μm. The Sn—Cu alloy phase is hard and it will thus contribute to reduced insertion force if the thickness is about 0.1 μm or more. On the other hand, when the thickness of Sn—Ni alloy phase is more than about 2.0 µm, fatigue characteristics tend to deteriorate.

Cu undercoat formed by electroplating is consumed by the Sn—Cu alloy phase formation during the reflowing treatment, and therefore the thickness of the Cu undercoat may possibly become zero. The upper limit for the thickness of the Cu phase is preferably about 2.0 µm or less after the reflowing treatment. Above about 2.0 µm, fatigue characteristics tend to deteriorate.

The aforementioned plating structure can be obtained by adjusting the thickness of Sn plating within about 0.4 to about 2.2 µm, and the thickness of Cu plating within about 0.1 to about 2.2 µm in electroplating, and then conducting reflowing treatment under appropriate conditions in temperature range of about 230 to about 600° C. and time range of about 3 to about 30 seconds.

c) Reflow Sn Plating with Ni Undercoat

For reflow Sn plating with Ni undercoat, Ni undercoat and Sn plating are applied in this order on the surface of copper alloy, and then reflowing treatment is performed. Since Ni contained in the Ni undercoat layer diffuses in the Sn plating layer during the reflowing treatment, the plating film structure comprises an Sn phase, an Sn—Ni phase, and a Ni phase in this order from the surface toward inside after the reflowing treatment.

The thickness of the Sn phase is preferably about 0.02 to about 2.0 µm after reflowing treatment. Below about 0.02 µm, solderability deteriorates. Above about 2.0 µm, fatigue characteristics tend to deteriorate.

The thickness of the Sn—Ni alloy phase is preferably about 0.1 to about 2.0 µm after the reflowing treatment. The Sn—Ni alloy phase is hard and it will thus contribute to reduced insertion force if the thickness is about 0.1 µm or more. On the other hand, when the thickness of Sn—Ni alloy phase is more than about 2.0 µm, fatigue characteristics tend to deteriorate.

Ni undercoat formed by electroplating is consumed by the Sn—Ni alloy phase formation during the reflowing treatment, and therefore the thickness of the Ni undercoat may possibly become zero. The upper limit for the thickness of the Ni phase is preferably about 2.0 µm or less after reflowing treatment. Above about 2.0 µm, fatigue characteristics tend to deteriorate.

The aforementioned plating structure can be obtained by adjusting the thickness of Sn plating within about 0.4 to about 2.2 µm, and the thickness of Ni plating within about 0.1 to about 2.2 µm in electroplating, and then conducting reflowing treatment under appropriate conditions in temperature range of about 230 to about 600° C. and time range of about 3 to about 30 seconds.

d) Reflow Sn Plating with Cu/Ni Undercoat

For reflow Sn plating with Cu/Ni undercoat, Ni undercoat, Cu undercoat and Sn plating are applied in this order, and then reflowing treatment is performed. Since Cu contained in the Cu undercoat layer diffuses in the Sn plating layer during the reflowing treatment, the plating film structure comprises an Sn phase, a Cu—Sn phase, and a Ni phase in this order from the surface toward inside after the reflowing treatment. Technologies related to this plating is disclosed, for example, in Japanese unexamined patent publication Nos. H6-196349, 2003-293187, and 2004-68026 (the entire disclosure of which is herein incorporated by reference).

The thickness of the Sn phase is preferably about 0.02 to about 2.0 µm after the reflowing treatment. Below about 0.02 µm, solderability deteriorates. Above about 2.0 µm, fatigue characteristics tend to deteriorate.

The thickness of the Sn—Cu alloy phase is preferably about 0.1 to about 2.0 µm after reflowing treatment. The Sn—Cu alloy phase is hard and it will thus contribute to reduced insertion force if the thickness is about 0.1 µm or more. On the other hand, when the thickness of the Sn—Ni alloy phase is more than about 2.0 µm, fatigue characteristics tend to deteriorate.

The thickness of the Ni phase is preferably about 0.1 to about 2.0 µm after the reflowing treatment. Below about 0.1 µm, plating characteristics such as corrosion resistance and thermal resistance deteriorate. Above about 2.0 µm, fatigue characteristics tend to deteriorate.

The aforementioned plating structure can be obtained by adjusting the thickness of Sn plating within about 0.4 to about 2.2 µm, the thickness of Cu plating within about 0.1 to about 0.4 µm, and the thickness of Ni plating within about 0.1 to about 2.0 µm in electroplating, and then conducting the reflowing treatment under appropriate conditions in temperature range of about 230 to about 600° C. and time range of about 3 to about 30 seconds.

(3) Type of Copper Alloy

Although there is no particular restriction on the type of copper alloy to which the invention is applicable, examples of copper alloy includes the following plating.

a) Cu—Ni—Si System Alloy

This copper alloy is called a Corson alloy. By conducting an age hardening process, particle of intermetallic compounds composed of Ni and Si are precipitated in Cu, thereby providing high strength and high electrical conductivity. Practical Corson alloys include C70250, C64745, C64725, C64760 (CDA (Copper Development Association) standard number).

In a preferred embodiment of the invention, the addition amount of Ni is about 1.0 to about 4.5 mass % (more preferably about 1.0 to about 4.0 mass %), and the addition amount of Si is about 0.2 to about 1.2 mass %. When Ni is added in an amount of less than about 1.0 mass % or Si less than about 0.2 mass %, the desired strength is not likely to be obtained even if the other element is added. In addition, when Ni is added in an amount of more than about 4.5 mass % or Si more than about 1.2 mass %, electrical conductivity will decrease and coarse Ni—Si particles, which do not contribute to the strength improvement, will generate in the matrix, thereby impairing bending workability and etching property, although it can achieve desired strength. With regard to the relation between Ni concentration and Si concentration, the Si concentration (mass %) is preferably about 1/6 to about 1/4 of the Ni concentration (mass %).

b) Phosphor Bronze

This copper alloy includes C52400, C52100, C51900, C51020 (CDA) as practical alloys.

In a preferred embodiment of the invention, the addition amount of Sn is about 1 to about 11 mass %. Increase in the addition amount of Sn improves strength, but tends to decrease electrical conductivity. Below about 1.0%, strength tends to become insufficient. Above about 11%, electrical conductivity tends to become insufficient.

In a preferred embodiment of the invention, P is added for the purpose of deoxidation, etc. in the amount of about 0.01 to about 0.35 mass %, more preferably about 0.01 to about 0.2 mass %. Below about 0.01%, oxygen concentration increases, thereby more likely causing the degradation of casting surface, increase the number of inclusions, and so forth. Above 0.35 mass %, electrical conductivity tends to decrease.

c) Brass, Red Brass

These copper alloys include C26000, C26800 (brass), C23000, C22000, C21000 (red brass) (CDA) as practical alloys.

Increase in the addition amount of Zn improves strength, but tends to decrease electrical conductivity. Therefore, when high electrical conductivity is required, red brass is used, and when high strength is required, brass is used. The addition amount of Zn is about 2 to about 22 mass % for red brass, and about 22 to about 40 mass % for brass. In case of red brass, when Zn is added in an amount of less than about 2 mass %, strength will deteriorate, and when Zn is added in an amount of more than about 22 mass % electrical conductivity will deteriorate. In case of brass, when Zn is added in an amount of less than about 22 mass %, strength will deteriorate, and Zn is added in an amount of more than about 40%, workability will deteriorate.

d) Titanium Copper

This copper alloy includes C19900 as a practical alloy. By conducting an age hardening process, the compounds of Ti and Cu are precipitated in Cu, thereby providing very high strength. In a preferred embodiment of the invention, the addition amount of Ti is about 1.0 to about 5.0 mass % (more preferably about 1.0 to about 4.0 mass %). Below 1.0 mass %, strength tends to become insufficient. Above 5.0 mass %, fractures tends to occur during casting or hot rolling process.

e) Optional Components

To improve the characteristics such as strength and thermal resistance of the copper alloys stated in the aforementioned items a), b), c) and d), one or more elements selected from the group consisting of Ni, Si, Sn, P, Zn, Ti, Mg, Al, Zr, Cr, Co, Mo, Fe, Ag and Mn may be further added in about 2.0 mass % or less in total concentration unless it impairs the advantageous features of the copper alloys. When added in the total concentration of less than 0.005 mass %, it produces no recognizable improvement in its characteristics. Therefore, the addition amount is preferably equal to or more than about 0.005 mass %. Above about 2.0 mass %, the decrease of electrical conductivity tends to become prominent. Incidentally, when a certain component is defined as the essential component, that component should be excluded from the optional components. That is, in case of the alloy a), Ni and Si are excluded, and one or more elements selected from Sn, P, Zn, Ti, Mg, Al, Zr, Cr, Co, Mo, Fe, Ag and Mn may be added in about 2.0 mass % or less in total. In case of the alloy of item b), Sn and P are excluded, and one or more elements selected from Ni, Si, Zn, Ti, Mg, Al, Zr, Cr, Co, Mo, Fe, Ag and Mn may be added in about 2.0 mass % or less in total. In case of the alloy c), Zn is excluded, and one or more elements selected from Ni, Si, Sn, P, Ti, Mg, Al, Zr, Cr, Co, Mo, Fe, Ag and Mn may be added in about 2.0 mass % or less in total. In case of the alloy d), Ti is excluded, and one or more elements selected from Ni, Si, Sn, P, Zn, Mg, Al, Zr, Cr, Co, Mo, Fe, Ag and Mn may be added in about 2.0 mass % or less in total.

(4) Method for Controlling Average Hydrogen Concentration

In Sn electroplating, Sn is reduced and precipitated by passing an electrical current in solution containing Sn ions using the material to be plated (i.e. copper alloy with undercoat) as a cathode. Since the electrical potential at which Sn ions are reduced is lower than the electrical potential at which hydrogen ions are reduced, hydrogen is generated on the surface of the material to be plated during the electroplating. Although the hydrogen is mostly escaped as hydrogen gas, part of the hydrogen is incorporated in the plating layer. It is believed that this hydrogen gas is dissociated to atomic hydrogen and diffused in the plating layer and copper alloy during the reflowing treatment. Consequently, it decreases the strength of crystalline grain boundaries in the plating layer and copper alloy, thereby degrading fatigue characteristics. To reduce the amount of hydrogen incorporated in the plating layer, the following exemplary measures are effective:

a) increasing the concentration of plating solute;
b) raising the temperature of plating liquid;
c) decreasing the electric current density;
d) lowering the acidity of plating liquid; and
e) adding a suitable surfactant in plating liquid.

EXAMPLES

Reflow Sn plating was applied on 16 types of copper alloys (having the thickness of 0.25 mm) shown in Table 1. As pretreatment, the surface of each copper alloy was cleansed by electrolytic degrease and pickling under the following conditions.

(Electrolytic degrease) The electrolytic degrease was performed on test pieces in alkaline aqueous solution using the test pieces as a cathode under the following conditions. Electric current density: 3 A/dm$^2$. Degreasing agent: PAKUNA P105 (Yuken Industry Co., Ltd.). Concentration of degreasing agent: 40 g/L. Temperature: 50° C. Time: 30 seconds. Electric current density: 3 A/dm$^2$.

(Pickling) The pickling was performed with 10 mass % sulfuric acid solution.

After cleansing, each copper alloy was covered with different undercoat plating and then with reflow Sn plating. Tables 2 to 4 show plating conditions used.

TABLE 1

| No. | composition (wt. %) | tensile strength (MPa) | 0.2 yield strength (MPa) | Young's modulus (GPa) | electrical cond. (% IACS) | average H conc. (mass ppm) | fatigue limit (MPa) |
|---|---|---|---|---|---|---|---|
| a | Cu—1.6% Ni—0.35% Si—0.50% Sn—0.40% Zn | 705 | 687 | 127 | 43 | 0.2 | 425 |
| b | Cu—7.9% Sn—0.12% P | 742 | 704 | 110 | 12 | 0.1 | 452 |
| c | Cu—30.5% Zn | 546 | 521 | 110 | 28 | 0.1 | 327 |
| d | Cu—7.9% Zn—0.30% Sn | 523 | 506 | 115 | 41 | 0.2 | 314 |
| e | Cu—3.2% Ti | 984 | 850 | 127 | 14 | 0.2 | 498 |
| f | Cu—1.6% Ni—0.35% Si | 654 | 625 | 126 | 59 | 0.1 | 387 |
| g | Cu—2.3% Ni—0.50% Si—0.12% Mg | 784 | 765 | 127 | 47 | 0.2 | 462 |
| h | Cu—3.8% Ni—0.80% Si—0.10% Mg—0.20% Mn | 846 | 825 | 127 | 41 | 0.2 | 487 |
| i | Cu—2.8% Ni—0.60% Si—0.50% Sn—0.40% Zn | 824 | 806 | 127 | 40 | 0.1 | 471 |
| j | Cu—7.8% Sn—0.04% P—0.15% Fe—0.15% Ni | 767 | 724 | 110 | 13 | 0.2 | 430 |
| k | Cu—4.9% Sn—0.10% P | 664 | 610 | 110 | 15 | 0.2 | 375 |
| l | Cu—4.9% Zn—0.18% Sn | 475 | 451 | 113 | 51 | 0.2 | 295 |
| m | Cu—11.4% Zn—1.45% Ni—0.30% Si—0.20% Sn | 723 | 701 | 115 | 29 | 0.1 | 440 |
| n | Cu—1.8% Ti | 883 | 841 | 120 | 21 | 0.2 | 504 |
| o | Cu—3.2% Ti—0.20% Fe | 1035 | 984 | 127 | 12 | 0.2 | 560 |
| p | Cu—3.0% Zn—0.17% Sn | 468 | 448 | 112 | 59 | 0.2 | 290 |

Table 2 shows conditions for Sn electroplating and reflowing Sn.

TABLE 2

|  | A | B | C | D |
|---|---|---|---|---|
| methansulfonic acid g/L | 80 | 80 | 80 | 120 |
| tin methanesulfonate g/L | 250 | 250 | 200 | 150 |
| surfactant g/L | 5 | 5 | 2 | 2 |
| temparature ° C. | 50 | 50 | 30 | 30 |
| current density A/dm$^2$ | 8 | 8 | 8 | 10 |
| stirring m/minute | 5 | 2 | 2 | 2 |
| reflowing conditions | heating at 260° C. for 5 seconds, and then quenching in water of 60° C. | | | |

Table 3 shows conditions for Cu undercoat plating.

TABLE 3

| sulfuric acid g/L | 60 |
|---|---|
| copper sulfate g/L | 200 |
| temparature ° C. | 25 |
| current density A/dm$^2$ | 5 |
| stirring m/minute | 5 |

Table 4 shows conditions for Ni undercoat plating.

TABLE 4

| nickel sulfate g/L | 250 |
|---|---|
| nickel chloride g/L | 45 |
| boric acid g/L | 30 |
| temparature ° C. | 50 |
| current density A/dm$^2$ | 5 |
| stirring m/minute | 5 |

By varying Sn electroplating conditions from A to D as listed in Table 2, average hydrogen concentration was changed. The following evaluations were made for the materials after reflowing.

a) Average Hydrogen Concentration

Average hydrogen concentrations were measured by Inert Gas Melting Thermal Conductivity Method (JIS-Z2614).

b) Plating Thickness

Each layer thicknesses of a Sn phase, an Sn—Cu alloy phase, an Sn—Ni alloy phase, a Cu phase, a Ni phase were measured. The measurements was made mainly by an electrolytic thickness tester. A fluorescent X-ray thickness tester, cross-section observation by SEM, cross-section observation by FIB, GDS (glow discharge emission spectrochemical analyzer) analysis on the surface, and the like were also used as necessary. For the measurements on Cu/Ni undercoat reflow Sn plating, reference was made to measurement techniques disclosed in Japanese unexamined patent publication No. 2004-58026 (the entire disclosure of which is herein incorporated by reference.).

c) Fatigue Characteristics

Figure 1:
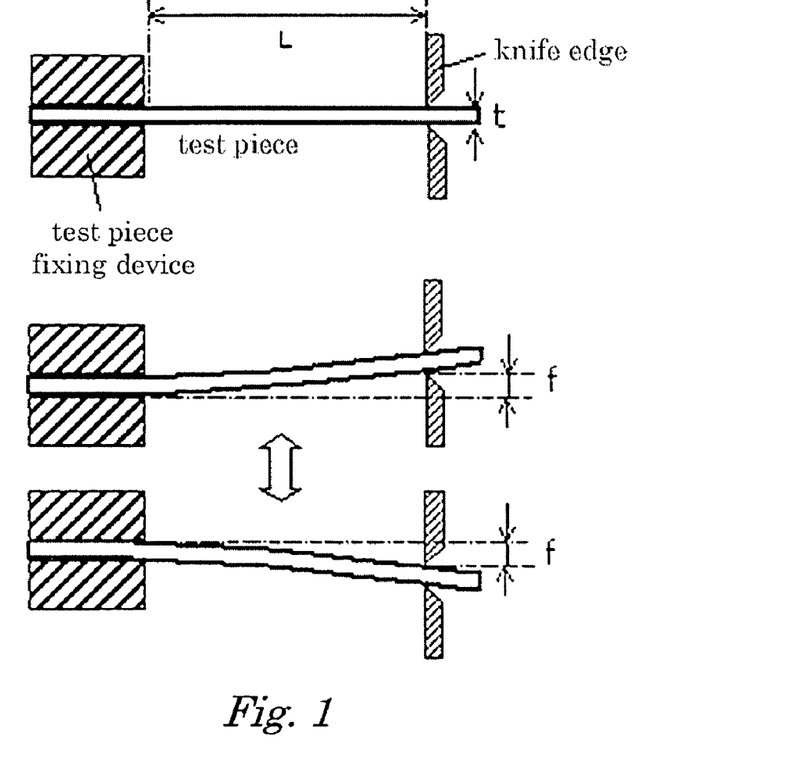
FIG. 1 shows a schematic diagram of a fatigue testing method.

A rectangular test piece with 10 mm width was taken such that the longitudinal direction of the test piece was in parallel with the rolling direction. The test piece was fixed as shown in FIG. 1. Alternating bending stresses were repeatedly applied on the test piece by vibrating the knife-edges in vertical direction, and number (N) of the vibrations repeated until the test piece was snapped was determined. The vibration waveform was 50 Hz sine wave. The stress σ applied on the test piece was calculated with the following equation:

$$L=(3 \cdot t \cdot E \cdot f/(2 \cdot \sigma))^{1/2}$$

wherein L is the length of vibrating section, t is test piece thickness, f is amplitude, and E is Young's modulus. In the experiment, σ was changed by adjusting L while f was constantly 2 mm.

Various N were calculated for different values σ to draw an SN curve. The value σ at which N became 10 million was determined using the SN curve, and the stress value at that point was regarded as a fatigue limit.

(1) Example 1

The effect of hydrogen absorbed during Sn plating on fatigue characteristics was studied using 16 types of copper alloys listed on Table 1. Sn plating was applied under four conditions A to D listed in Table 2 for the following cases where reflow Sn plating was directly applied on the copper alloy, where reflow Sn plating was applied after Cu undercoat poating, where reflow Sn plating was applied after Ni undercoat plating, and where reflow Sn plating was applied after Ni and Cu undercoats were applied in this order. Average hydrogen concentration was measured, and a fatigue test was conducted to measure a fatigue limit for each Sn plated material.

Tables 5, 6, 7 and 8 shows each plating thicknesses after electroplating, each plating thicknesses after reflowing, average hydrogen concentrations, and fatigue limits for each case of no undercoat, Cu undercoat, Ni undercoat, and Cu/Ni undercoat. Incidentally, Table 1 shows the average hydrogen concentrations and fatigue limits of the test pieces before plating.

The following results were obtained regardless of type of copper alloy or undercoat.

(1) Average hydrogen concentration became higher in the order of Sn plating conditions A, B, C and D, and the average hydrogen concentration obtained under condition D exceeded the upper limit of the invention (2 mass ppm).

(2) The fatigue limit of test pieces having average hydrogen concentration equal to or less than 2 mass ppm was close to that before plating (Table 1).

(3) The fatigue limit of test pieces having average hydrogen concentration more than 2 mass ppm was very low.

Figure 2:
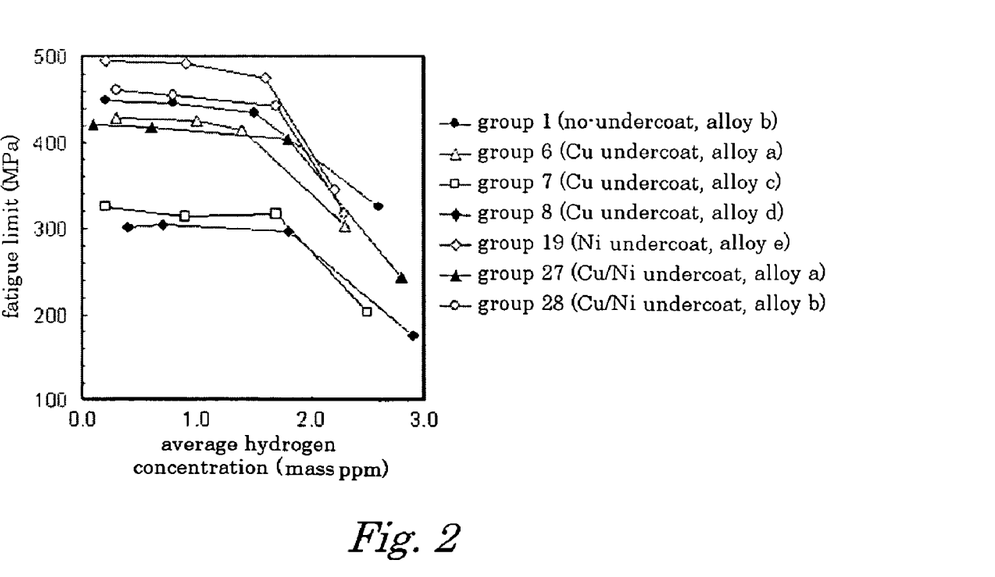
FIG. 2 is a graph showing the relation between the average hydrogen concentration and fatigue limit of Sn-plated copper alloy strips.

FIG. 2 is a graph showing the relation between the average hydrogen. concentration and fatigue limit for the groups 1, 6, 7, 8, 19, 27 and 28. For all groups, the fatigue limit of test pieces having average hydrogen concentration more than 2 mass ppm decreased drastically.

Incidentally, measured values for the pre-reflowing average hydrogen concentration and fatigue limit of the comparative examples in the group 6 were 2.5 ppm and 390 MPa respectively. This result shows that the effect of hydrogen on fatigue characteristics becomes prominent by reflowing treatment.

TABLE 5

| | | copper alloy | thickness after elec. plating (μm) Sn | thickness after reflowing (μm) Sn—Cu alloy | thickness after reflowing (μm) Sn phase | Sn plating conditions | average H conc. (mass. ppm) | fatigue limit (MPa) |
|---|---|---|---|---|---|---|---|---|
| group 1 | example | b | 1.10 | 0.82 | 0.61 | A | 0.2 | 450 |
| | example | b | 1.10 | 0.78 | 0.60 | B | 0.8 | 446 |
| | example | b | 1.10 | 0.83 | 0.58 | C | 1.5 | 435 |
| | comp. exam. | b | 1.10 | 0.81 | 0.59 | D | 2.6 | 325 |
| group 2 | example | j | 1.15 | 0.84 | 0.65 | C | 1.6 | 430 |
| | comp. exam. | j | 1.15 | 0.82 | 0.65 | D | 2.5 | 306 |
| group 3 | example | k | 0.95 | 0.80 | 0.48 | B | 0.7 | 377 |
| | comp. exam. | k | 0.95 | 0.79 | 0.47 | D | 2.3 | 286 |
| group 4 | example | l | 1.20 | 0.82 | 0.74 | C | 1.8 | 292 |
| | comp. exam. | l | 1.20 | 0.82 | 0.72 | D | 2.7 | 187 |
| group 5 | example | d | 1.00 | 0.83 | 0.52 | A | 0.1 | 315 |
| | comp. exam. | d | 1.00 | 0.82 | 0.51 | D | 2.7 | 211 |

TABLE 6

| | | copper alloy | thickness after elec. plating (μm) Cu undercoat | thickness after elec. plating (μm) Sn | thickness after reflowing (μm) Cu phase | thickness after reflowing (μm) Sn—Cu alloy phase | thickness after reflowing (μm) Sn phase | Sn plating conditions | average H conc. (mass. ppm) | fatigue limit (MPa) |
|---|---|---|---|---|---|---|---|---|---|---|
| group 6 | example | a | 0.30 | 0.80 | 0.03 | 1.08 | 0.40 | A | 0.3 | 430 |
| | example | a | 0.30 | 0.80 | 0.00 | 0.99 | 0.42 | B | 1.0 | 426 |
| | example | a | 0.30 | 0.80 | 0.02 | 1.04 | 0.40 | C | 1.4 | 415 |
| | comp. exam. | a | 0.30 | 0.80 | 0.00 | 1.02 | 0.43 | D | 2.3 | 304 |
| group 7 | example | c | 0.60 | 0.95 | 0.32 | 1.13 | 0.46 | A | 0.2 | 325 |
| | example | c | 0.60 | 0.95 | 0.30 | 1.13 | 0.47 | B | 0.9 | 314 |
| | example | c | 0.60 | 0.95 | 0.28 | 1.12 | 0.45 | C | 1.7 | 316 |
| | comp. exam. | c | 0.60 | 0.95 | 0.32 | 1.15 | 0.48 | D | 2.5 | 203 |
| group 8 | example | d | 0.27 | 1.15 | 0.00 | 0.93 | 0.65 | A | 0.4 | 301 |
| | example | d | 0.27 | 1.15 | 0.00 | 0.91 | 0.64 | B | 0.7 | 305 |
| | example | d | 0.27 | 1.15 | 0.00 | 0.95 | 0.67 | C | 1.8 | 298 |
| | comp. exam. | d | 0.27 | 1.15 | 0.00 | 0.97 | 0.66 | D | 2.9 | 175 |
| group 9 | example | e | 0.35 | 1.20 | 0.08 | 1.16 | 0.72 | A | 0.2 | 495 |
| | comp. exam. | e | 0.35 | 1.20 | 0.05 | 1.14 | 0.72 | D | 2.4 | 344 |
| group 10 | example | f | 0.32 | 0.75 | 0.00 | 0.98 | 0.38 | A | 0.3 | 388 |
| | comp. exam. | f | 0.32 | 0.75 | 0.01 | 0.97 | 0.36 | D | 2.4 | 275 |
| group 11 | example | g | 0.60 | 1.00 | 0.30 | 1.02 | 0.50 | B | 0.8 | 465 |
| | comp. exam. | g | 0.60 | 1.00 | 0.29 | 1.02 | 0.48 | D | 2.5 | 315 |
| group 12 | example | h | 0.28 | 1.05 | 0.00 | 1.04 | 0.56 | A | 0.1 | 488 |
| | comp. exam. | h | 0.28 | 1.05 | 0.00 | 1.02 | 0.55 | D | 2.6 | 340 |
| group 13 | example | i | 0.25 | 0.80 | 0.00 | 0.95 | 0.42 | B | 1.0 | 470 |
| | comp. exam. | i | 0.25 | 0.80 | 0.00 | 0.95 | 0.40 | D | 2.1 | 316 |
| group 14 | example | l | 0.50 | 1.00 | 0.20 | 1.10 | 0.46 | B | 0.8 | 292 |
| | comp. exam. | l | 0.50 | 1.00 | 0.18 | 1.02 | 0.48 | D | 2.5 | 170 |
| group 15 | example | m | 0.30 | 1.10 | 0.00 | 1.05 | 0.60 | C | 1.4 | 438 |
| | comp. exam. | m | 0.30 | 1.10 | 0.00 | 1.07 | 0.60 | D | 2.3 | 298 |
| group 16 | example | n | 0.50 | 1.20 | 0.21 | 1.05 | 0.72 | C | 1.5 | 501 |
| | comp. exam. | n | 0.50 | 1.20 | 0.19 | 1.04 | 0.73 | D | 2.5 | 331 |
| group 17 | example | o | 0.60 | 0.85 | 0.28 | 1.05 | 0.44 | C | 1.7 | 562 |
| | comp. exam. | o | 0.60 | 0.85 | 0.29 | 1.06 | 0.43 | D | 2.6 | 376 |
| group 18 | example | p | 0.27 | 0.80 | 0.00 | 0.98 | 0.41 | B | 1.5 | 294 |
| | comp. exam. | p | 0.27 | 0.80 | 0.00 | 0.96 | 0.42 | D | 2.4 | 183 |

TABLE 7

| | | copper alloy | thickness after elec. plating (μm) | | thickness after reflowing (μm) Sn—Ni | | | Sn plating conditions | average H conc. (mass. ppm) | fatigue limit (MPa) |
|---|---|---|---|---|---|---|---|---|---|---|
| | | | Ni undercoat | Sn | Ni phase | alloy phase | Sn phase | | | |
| group 19 | example | e | 1.50 | 1.00 | 1.25 | 1.16 | 0.53 | A | 0.2 | 496 |
| | example | e | 1.50 | 1.00 | 1.20 | 1.12 | 0.52 | B | 0.9 | 492 |
| | example | e | 1.50 | 1.00 | 1.23 | 1.16 | 0.54 | C | 1.6 | 475 |
| | comp. exam. | e | 1.50 | 1.00 | 1.18 | 1.15 | 0.52 | D | 2.2 | 345 |
| group 20 | example | a | 0.60 | 1.20 | 0.28 | 1.08 | 0.73 | B | 0.7 | 425 |
| | comp. exam. | a | 0.60 | 1.20 | 0.27 | 1.10 | 0.72 | D | 2.3 | 280 |
| group 21 | example | b | 1.00 | 1.05 | 0.63 | 1.12 | 0.60 | B | 0.5 | 450 |
| | comp. exam. | b | 1.00 | 1.05 | 0.62 | 1.13 | 0.58 | D | 2.4 | 304 |
| group 22 | example | c | 0.50 | 0.90 | 0.15 | 1.06 | 0.40 | C | 1.5 | 325 |
| | comp. exam. | c | 0.50 | 0.90 | 0.15 | 1.05 | 0.41 | D | 2.5 | 229 |
| group 23 | example | d | 0.30 | 0.80 | 0.00 | 0.96 | 0.35 | C | 1.5 | 315 |
| | comp. exam. | d | 0.30 | 0.80 | 0.00 | 0.94 | 0.34 | D | 2.4 | 219 |
| group 24 | example | e | 0.40 | 0.95 | 0.08 | 1.03 | 0.48 | B | 1.0 | 498 |
| | comp. exam. | e | 0.40 | 0.95 | 0.10 | 1.03 | 0.47 | D | 2.7 | 345 |
| group 25 | example | f | 0.80 | 1.10 | 0.45 | 1.10 | 0.62 | A | 0.2 | 386 |
| | comp. exam. | f | 0.80 | 1.10 | 0.46 | 1.12 | 0.64 | D | 2.2 | 273 |
| group 26 | example | g | 0.25 | 0.85 | 0.00 | 0.95 | 0.38 | B | 0.8 | 461 |
| | comp. exam. | g | 0.25 | 0.85 | 0.00 | 0.95 | 0.36 | D | 2.6 | 326 |

TABLE 8

| | | copper alloy | thickness after electrical plating (μm) | | | thickness after reflowing (μm) Sn—Cu | | | Sn plating conditions | average H conc. (mass. ppm) | fatigue limit (MPa) |
|---|---|---|---|---|---|---|---|---|---|---|---|
| | | | Ni undercoat | Cu undercoat | Sn | Ni phase | alloy phase | Sn phase | | | |
| group 27 | example | a | 0.20 | 0.25 | 0.70 | 0.20 | 1.05 | 0.28 | A | 0.1 | 421 |
| | example | a | 0.20 | 0.25 | 0.70 | 0.19 | 1.00 | 0.28 | B | 0.6 | 418 |
| | example | a | 0.20 | 0.25 | 0.70 | 0.20 | 1.09 | 0.30 | C | 1.8 | 405 |
| | comp. exam. | a | 0.20 | 0.25 | 0.70 | 0.19 | 1.06 | 0.29 | D | 2.8 | 245 |
| group 28 | example | b | 1.00 | 0.20 | 1.20 | 0.97 | 0.98 | 0.75 | A | 0.3 | 461 |
| | example | b | 1.00 | 0.20 | 1.20 | 0.95 | 1.01 | 0.72 | B | 0.8 | 455 |
| | example | b | 1.00 | 0.20 | 1.20 | 0.98 | 1.03 | 0.73 | C | 1.7 | 442 |
| | comp. exam. | b | 1.00 | 0.20 | 1.20 | 0.95 | 1.00 | 0.75 | D | 2.3 | 316 |
| group 29 | example | c | 0.25 | 0.30 | 0.80 | 0.23 | 1.08 | 0.35 | A | 0.2 | 325 |
| | comp. exam. | c | 0.25 | 0.30 | 0.80 | 0.24 | 1.07 | 0.36 | D | 2.6 | 225 |
| group 30 | example | d | 0.30 | 0.25 | 0.75 | 0.30 | 1.03 | 0.41 | B | 1.0 | 314 |
| | comp. exam. | d | 0.30 | 0.25 | 0.75 | 0.29 | 1.04 | 0.40 | D | 2.1 | 216 |
| group 31 | example | e | 0.40 | 0.30 | 0.70 | 0.38 | 1.08 | 0.25 | C | 1.5 | 500 |
| | comp. exam. | e | 0.40 | 0.30 | 0.70 | 0.38 | 1.08 | 0.27 | D | 2.9 | 348 |
| group 32 | example | f | 0.26 | 0.28 | 0.80 | 0.25 | 1.07 | 0.35 | A | 0.1 | 387 |
| | comp. exam. | f | 0.26 | 0.28 | 0.80 | 0.26 | 1.07 | 0.35 | D | 2.4 | 259 |
| group 33 | example | g | 0.28 | 0.30 | 0.80 | 0.26 | 1.10 | 0.33 | B | 0.6 | 461 |
| | comp. exam. | g | 0.28 | 0.30 | 0.80 | 0.27 | 1.09 | 0.35 | D | 2.3 | 316 |
| group 34 | example | h | 0.25 | 0.20 | 0.75 | 0.24 | 0.98 | 0.32 | C | 1.8 | 488 |
| | comp. exam. | h | 0.25 | 0.20 | 0.75 | 0.22 | 1.00 | 0.32 | D | 2.5 | 348 |
| group 35 | example | i | 0.35 | 0.15 | 0.70 | 0.33 | 0.88 | 0.31 | A | 0.3 | 473 |
| | comp. exam. | i | 0.35 | 0.15 | 0.70 | 0.34 | 0.87 | 0.29 | D | 2.6 | 336 |
| group 36 | example | j | 0.30 | 0.25 | 0.65 | 0.30 | 1.05 | 0.24 | B | 0.6 | 428 |
| | comp. exam. | j | 0.30 | 0.25 | 0.65 | 0.29 | 1.03 | 0.25 | D | 2.2 | 304 |
| group 37 | example | k | 0.32 | 0.32 | 0.60 | 0.30 | 1.11 | 0.19 | C | 1.4 | 374 |
| | comp. exam. | k | 0.32 | 0.32 | 0.60 | 0.31 | 1.12 | 0.20 | D | 2.7 | 269 |
| group 38 | example | l | 0.20 | 0.29 | 0.85 | 0.19 | 1.08 | 0.40 | A | 0.2 | 295 |
| | comp. exam. | l | 0.20 | 0.29 | 0.85 | 0.18 | 1.09 | 0.42 | D | 2.6 | 211 |
| group 39 | example | m | 0.30 | 0.30 | 0.80 | 0.28 | 1.09 | 0.36 | B | 0.8 | 440 |
| | comp. exam. | m | 0.30 | 0.30 | 0.80 | 0.28 | 1.09 | 0.37 | D | 2.8 | 308 |
| group 40 | example | n | 0.29 | 0.27 | 0.75 | 0.27 | 1.06 | 0.31 | C | 1.5 | 501 |
| | comp. exam. | n | 0.29 | 0.27 | 0.75 | 0.28 | 1.08 | 0.32 | D | 2.2 | 351 |
| group 41 | example | o | 0.60 | 0.30 | 0.90 | 0.57 | 1.10 | 0.45 | A | 0.2 | 557 |
| | comp. exam. | o | 0.60 | 0.30 | 0.90 | 0.56 | 1.08 | 0.46 | D | 2.3 | 394 |
| group 42 | example | p | 0.20 | 0.25 | 0.75 | 0.20 | 0.98 | 0.30 | B | 0.3 | 290 |
| | comp. exam. | p | 0.20 | 0.25 | 0.75 | 0.20 | 1.00 | 0.29 | D | 2.4 | 197 |

(2) Example 2

The effect of thickness of each plating layer on fatigue characteristics is explained hereinafter.

TABLE 9

Effect of Sn, Cu—Sn and Ni phases thickness on fatigue characteristics
(Undercoat: Cu/Ni, Copper alloy: a, Sn plating condision: A)

| | thickness after electrical plating (μm) | | | thickness after reflowing (μm) | | | | | average H conc. (mass. ppm) | fatigue limit (MPa) |
|---|---|---|---|---|---|---|---|---|---|---|
| | | | | | | Sn—Cu | | | | |
| No. | Ni undercoat | Cu undercoat | Sn | Ni phase | Cu phase | alloy phase | Sn phase | reflowing time (s) | | |
| 1 | 0.20 | 0.25 | 0.65 | 0.20 | 0.00 | 1.03 | 0.25 | 5 | 0.1 | 419 |
| 2 | 0.20 | 0.25 | 1.50 | 0.19 | 0.00 | 1.15 | 0.82 | 5 | 0.2 | 424 |
| 3 | 0.20 | 0.25 | 2.00 | 0.19 | 0.00 | 1.13 | 1.84 | 5 | 0.1 | 412 |
| 4 | 0.20 | 0.25 | 2.50 | 0.20 | 0.00 | 1.12 | 2.21 | 5 | 0.2 | 365 |
| 5 | 0.20 | 0.25 | 2.50 | 0.20 | 0.00 | 2.56 | 0.32 | 10 | 0.2 | 355 |
| 6 | 1.20 | 0.25 | 0.70 | 1.16 | 0.00 | 1.02 | 0.31 | 5 | 0.1 | 418 |
| 7 | 2.20 | 0.25 | 0.70 | 2.17 | 0.00 | 1.06 | 0.29 | 5 | 0.2 | 332 |

Table 9 shows data indicating the effect of thickness of an Sn phase, an Sn—Cu phase, or a Ni phase. After Ni and Cu undercoats were applied in this order on copper alloy a), reflow Sn plating was applied under condition A. However, the heating time in reflowing was longer for test piece No. 5. Average hydrogen concentration was sufficiently low for all test pieces. No. 4 having an Sn phase of more than 2.0 μm thickness, No. 5 having an Sn—Cu phase of more than 2.0 μm thickness, and No. 7 having a Ni phase of more than 2.0 μm thickness had lower fatigue limit than that of the other test pieces.

TABLE 10

Effect of Cu phase thickness on fatigue characteristics
(Undercoat: Cu, Copper alloy: c, Sn plating condision: A)

| | thickness after elec. plating (μm) | | | thickness after reflowing (μm) | | | | average H conc. (mass. ppm) | fatigue limit (MPa) |
|---|---|---|---|---|---|---|---|---|---|
| | | | | | Sn—Cu | | | | |
| No. | Cu undercoat | Sn | | Cu phase | alloy phase | Sn phase- | reflowing time (s) | | |
| 8 | 0.25 | 1.15 | | 0.00 | 1.05 | 0.62 | 5 | 0.2 | 310 |
| 9 | 0.60 | 1.15 | | 0.32 | 1.13 | 0.60 | 5 | 0.2 | 315 |
| 10 | 1.20 | 1.15 | | 0.95 | 1.10 | 0.65 | 5 | 0.3 | 312 |
| 11 | 2.50 | 1.15 | | 2.08 | 1.08 | 0.60 | 5 | 0.2 | 263 |

Table 10 shows data indicating the effect of thickness of a Cu phase. After Cu undercoat was applied on copper alloy c), reflow Sn plating was applied under condition A. Average hydrogen concentration was sufficiently low for all test pieces. Test piece No. 11 having a Cu phase of more than 2.0 μm thickness had lower fatigue limit than that of the other test pieces.

What is claimed is:

1. An Sn-plated copper alloy strip comprising an Sn or Sn alloy plating film formed on the surface of a copper alloy strip by electroplating and reflowing treatment, wherein the average hydrogen concentration in the Sn-plated copper alloy strip is 0.1 to 2 mass ppm, and the fatigue limit is about 300 to about 500 MPa when measured by:

taking a rectangular piece with 10 mm width such that the longitudinal direction of the piece is parallel with a rolling direction of the strip;

applying alternating bending stresses repeatedly on the piece in a direction perpendicular to a thickness of the piece, and determining a number of vibrations repeated until the piece is snapped, the vibration waveform being 50 Hz sine wave, the stress σ applied to the piece being calculated by the equation: $L=(3 \cdot t \cdot E \cdot f/(2 \cdot \sigma))^{1/2}$, where:

L is the length of the vibrating section, t is the thickness of the piece, f is the amplitude of the vibration, and E is Young's modulus;

calculating N for different values of σ to determine an SN curve;

determining from the SN curve a value of σ at which N=10 million; and taking the value of σ at that point as the fatigue limit.

2. The Sn-plated copper alloy strip of claim 1, wherein the plating film comprises an Sn phase and an Sn—Cu alloy phase in this order from the plating film surface toward inside, and the thickness of the Sn—Cu alloy phase being about 0.1 to about 2.0 μm.

3. The Sn-plated copper alloy strip of claim 1, wherein the plating film comprises an Sn phase, an Sn—Cu alloy phase and a Cu alloy phase in this order from the plating film surface toward inside, the thickness of the Sn—Cu alloy phase being about 0.1 to about 2.0 μm, and the thickness of the Cu alloy phase being up to about 2.0 μm.

4. The Sn-plated copper alloy strip of claim 1, wherein the plating film comprises an Sn phase, an Sn—Ni alloy phase, and a Ni alloy phase in this order from the plating film surface toward inside, the thickness of the Sn—Ni alloy phase being about 0.1 to about 2.0 μm, and the thickness of the Ni alloy phase being up to about 2.0 μm.

5. The Sn-plated copper alloy strip of claim 1, wherein the plating film comprises an Sn phase, a Cu—Sn alloy phase, and a Ni alloy phase in this order from the plating film surface toward inside, the thickness of the Cu—Sn alloy phase being about 0.1 to about 2.0 μm, and the thickness of the Ni alloy phase being about 0.1 to about 2.0 μm.

6. The Sn-plated copper alloy strip of any one of claims 1 to 5, wherein the copper alloy strip comprises about 1.0 to about 4.5 mass % of Ni, about 0.2 to about 1.2 mass % of Si, optionally one or more elements selected from the group consisting of Sn, P, Zn, Ti, Mg, Al, Zr, Cr, Co, Mo, Fe, Ag and Mn in about 2.0 mass % or less in total, and the balance being copper and unavoidable impurities.

7. The Sn-plated copper alloy strip of any one of claims 1 to 5, wherein the copper alloy strip comprises about 22 to about 40 mass % of Zn, optionally one or more elements selected from the group consisting of Ni, Si, Sn, P, Ti, Mg, Al, Zr, Cr, Co, Mo, Fe, Ag and Mn in about 2.0 mass % or less in total, and the balance being copper and unavoidable impurities.

8. The Sn-plated copper alloy strip of any one of claims 1 to 5, wherein the copper alloy strip comprises about 2 to about 22 mass % of Zn, optionally one or more elements selected from the group consisting of Ni, Si, Sn, P, Ti, Mg, Al, Zr, Cr, Co, Mo, Fe, Ag and Mn in about 2.0 mass % or less in total, and the balance being copper and unavoidable impurities.

\* \* \* \* \*